United States Patent

Rideg

(10) Patent No.: US 8,418,996 B2
(45) Date of Patent: Apr. 16, 2013

(54) SOLID MATERIAL VALVE

(75) Inventor: Mihaly Rideg, Budapest (HU)

(73) Assignees: Hans Jurgen Werner (DE); Gabor Fazekas (HU)

( * ) Notice: Subject to any disclaimer, the term of this patent is extended or adjusted under 35 U.S.C. 154(b) by 1035 days.

(21) Appl. No.: 12/229,465

(22) Filed: Aug. 22, 2008

(65) Prior Publication Data

US 2009/0078903 A1 Mar. 26, 2009

(30) Foreign Application Priority Data

Aug. 24, 2007 (DE) .......................... 10 2007 040 296

(51) Int. Cl.
*F16K 31/00* (2006.01)
*B65D 83/00* (2006.01)

(52) U.S. Cl.
USPC ........................................ 251/353; 222/402.1

(58) Field of Classification Search .......... 251/353–354, 251/339, 349, 337; 222/402.1, 402.23–402.25, 222/190; 277/562, 567, 647
See application file for complete search history.

(56) References Cited

U.S. PATENT DOCUMENTS

| | | | | |
|---|---|---|---|---|
| 1,965,718 A * | 7/1934 | Wiley | ............................. | 403/253 |
| 2,686,652 A * | 8/1954 | Carlson et al. | ............ | 222/402.24 |
| 2,739,841 A * | 3/1956 | Soffer | ............................ | 251/349 |
| 2,809,774 A | 10/1957 | Kaye et al. | | |
| 2,839,225 A * | 6/1958 | Soffer et al. | ............. | 222/402.16 |
| 2,994,461 A * | 8/1961 | Michel | ...................... | 222/153.11 |
| 4,805,813 A * | 2/1989 | Metcoff et al. | ........... | 222/402.22 |
| 4,824,075 A * | 4/1989 | Holzboog | ...................... | 251/349 |
| 5,255,640 A * | 10/1993 | Pierce | ......................... | 123/90.67 |
| 5,450,983 A | 9/1995 | Stern et al. | | |
| 2005/0001196 A1* | 1/2005 | Mc Arthy et al. | ............. | 251/214 |
| 2006/0169942 A1* | 8/2006 | Hesher et al. | ................. | 251/337 |
| 2006/0243940 A1* | 11/2006 | De Schrijver | ................ | 251/299 |

* cited by examiner

*Primary Examiner* — John K Fristoe, Jr.
*Assistant Examiner* — David Colon Morales
(74) *Attorney, Agent, or Firm* — Berliner & Associates

(57) ABSTRACT

Solid material valve for pressurized cans, especially for the discharge of mounting foams, provided with a valve body (2) arranged in a valve disk (1), a stem (3) guided within a central cut-out (21) of the valve body (2), with at least one inlet opening cleared for the passage of the can contents by actuating said stem (3) as well as one central discharge opening, one elastic element (4) acting on the stem (3) and sealing elements (22, 23) arranged and acting between the valve disk (1) and valve body (2) and between valve body (2) and stem (3), the elastic element (4) being provided with at least one formed part made of a rubber-elastic material and surrounding the stem (3) concentrically, with said elastic element (4) resting on the valve body (2) at the can side and on the stem (3) at the valve side.

13 Claims, 5 Drawing Sheets

SOLID MATERIAL VALVE

The invention relates to a solid material valve for pressurized cans, especially for the discharge of mounting foams, provided with a valve body arranged in a valve disk, a stem guided within a central cut-out of the valve body, with at least one inlet opening cleared for the passage of the can contents by actuating said stem as well as at least one discharge opening, one elastic element acting on the stem and sealing elements arranged and acting between the valve disk and valve body and between valve body and stem.

The solid material valves may in particular be used for discharging mounting and sealing foams from aerosol cans; they are, however, also suitable basically for all types of aerosol cans intended for the discharge of materials having a solids content, for example cans discharging paint material, glues, sealing and cleaning agents.

Foams for mounting purposes, in particular polyurethane foams and foams of comparable material, are widely used for all kinds of industrial applications. In the building and construction industry they serve to secure elements such as casement and door frames and other prefabricated components, seal openings, fill hollow spaces and pockets with foam. More often than not they are used for thermal and sound insulation purposes. Moreover, they are suited to fill hollow spaces and thus prevent the formation of condensate that may cause corrosion problems.

Foam producing agents usually employed in a pressurized container are pre-polymers often curing under the influence of moisture, in particular air humidity. As soon as the mixture of propellant and foaming agents has been released a reaction occurs between the prepolymer and the moisture contained in the air. This leads to the formation of durable foam. Depending on the atmospheric humidity content curing takes place within a relatively short period of time. If air humidity is high, curing will take just a few minutes. The same applies to silane terminated polyurethane foams. In the event of two-component foams a separate cross-linking component is additionally provided in the pressurized container.

Special valves serve to discharge or expel the foam with said valves clearing the foam path in that they are tilted or pushed down. During handling and intermediate storage, however, they must reliably seal off the system. Should such sealing action prove to be insufficient moisture will diffuse into the valve mechanism causing the prepolymers in the valve to harden which impairs the correct functioning of the valve. In the worst case the valve will be blocked completely as a result of the polymer that has formed inside.

Disk valves are known that provide for a valve closure element to be joined via a coil spring to a retaining part serving as abutment. The retaining part is allowed to freely project into the interior of the pressurized container. The spring is mounted between retaining part and valve closure element securing it firmly on the valve disk. Retaining part and spring are fully accessible to the media to be discharged. When actuating the valve closure element this mixture of propellant and prepolymer exits the pressurized container and thus enters the area where spring and its retaining part are located. As the pressure acting on the valve closure element decreases the spring again presses said element against the valve disk thus preventing the mixture from exiting any further. Mixture still present in the valve space will be discharged through action of the propellant.

Disk valves of this type with spring mechanism are well suited for connections to spray guns. Nevertheless, they have a disadvantage in that the function of the spring is impaired or even blocked sooner or later because moisture diffuses into the valve mechanism and causes polymer formation in the spring area. As a result of this the pressurized container will be unable to discharge in a controlled manner or becomes leaky and expels irregularly.

In line with other valve variants sealing sections are provided at the periphery of the valve closure element. These comprise of at least one elastically deformable disk-shaped section projecting radially from the closure element and becoming deformed when contacting the valve seat. Sealing and closure elements are of 'monolithic' design and thus made of the same material. In the interest of deformability these elements need to be elastic to some extent which puts a limitation on the pressing forces applied and thus reduces tightness.

It is, therefore, the object of the present invention to provide a valve that does away with the above described disadvantages prior-art valves suffer. Said valve shall prevent moisture from entering the valve space situated within the pressureized container. At the same time, the design must enable discharge aids such as spray guns to be connected. The valve should be of simple construction and provide a high degree of operational safety. In particular, such a valve shall not have a spring mechanism located inside.

To achieve this objective and based on the valve type first mentioned above the invention proposes that the elastic element is provided with at least one formed part made of a rubber-elastic material and surrounding the stem concentrically with said elastic element resting on the valve body at the can side and on the stem at the valve side.

The valve enables the pressurized can to be properly connected to a spray gun of customary design. According to the invention, with the sealing elements arranged and acting between valve body and stem and the elastic element at least to some extent designed as a formed part, the valve thus has two independently acting sealing elements making it difficult for moisture to enter the valve.

The terms "can side" and "valve side" as used in the description and claims denote, with reference to an extension along the central axis of a pressure can, the end of a piece or part facing towards the pressurized can (can side) or the end of a piece or part that points out of the can (valve side).

The inventive solid material valve for pressurized cans is provided with a customary valve disk in which a central circular cut-out has been arranged. Between the cut-out and the outer skirting the valve disk as a rule has a trough-shaped section provided with a raised inner rim supporting the valve body.

The valve body proper can be attached to the valve disk by molding in a manner known per se, i.e. the raised inner rim of the valve disk is located inside the valve body. Alternatively and preferred here is an embodiment in which the valve body is adapted to the shape of the valve disk, has an upright rim provided with an outward projection engaging with and extending over the inside rim of the valve disk. Moreover, an outwardly extending area of the valve body fits to the contour of the valve disk and is in close contact with it. The projection pointing outwardly and extending over the inner rim of the valve disk secures the valve body at the valve disk. A can-side circumferential rim at the outside of the valve body can be provided for stabilizing purposes, also another rim arranged on the inside, approximately near the upright rim extending towards the valve side.

It is considered expedient that the valve body in the area where it is in contact with the valve disk has concentrically extending circumferential seal lips improving the sealing effect even more. Preferably, these sealing lips are arranged such that they act on a valve disk area rounded inwardly at the base of the upright inner rim.

The valve body has a central cut-out wherein the stem of the valve is guided. At the can-side rim of this central cut-out there is at least one concentrically extending circumferential sealing lip acting against a seat arranged on the stem. Preferably, the valve body is provided with at least two sealing lips arranged in this area. The seating face of the stem is a concentric enlargement with tapered or arched outer contour arranged at the can-side end of the stem. With the valve in closed position (the stem is at rest) the sealing lips act against this concentric enlargement thus closing off the inlet openings to the interior of the can, said openings being arranged at the can-side end at the side of the stem.

Expediently, the valve body is provided with two sealing lips acting in this manner on the seat or sealing face of the stem and being primarily arranged parallelly to each other and parallelly to the extension of the stem.

The stem of the solid material valve according to the invention is movably arranged in the central cut-out of the valve body. In particular, the valve body with its inner wall contacting the outer wall of the stem guides the stem and thus enables it to be actuated in vertical direction. When at rest, i.e. not being actuated, the stem is in upper position with the sealing lips of the valve body having a sealing effect at the sealing face on the stem (rest position). When the stem is in lower, i.e. actuated position the sealing lips no longer have a sealing effect on the sealing face so that the inlet openings for the prepolymer located at the can-side end of the stem are freely accessible from the interior of the can (working position). The stem has, in particular, been provided with an upper outlet opening that enables the prepolymer/propellant mixture to be freely discharged in working position.

The elastic element fulfills two functions. One is a spring function required to return the stem to its rest position. "Rubber-elastic" in this context means that the element same as rubber exerts a restoring force. On the other hand, the elastic element serves as sealing component. This sealing effect is achieved in two places, one being the can-side area of the elastic element between valve body and stem where, especially when the valve is in open position, the discharge of foam is prevented between the valve body and the stem guided by it. The other sealing location is achieved at a connected spray gun that extends over the elastic element and thus needs to be sealed off here as well when the valve is in open position and foam is present. For this purpose circumferential outer sealing ribs may be provided.

This sealing effect as well is achieved by means of the elastic element, particularly when the valve is in working position, as is described in more detail below.

At the can-side the elastic element is supported on the valve body and at the valve-side by the upper end of the stem. Actuating or pressing down the stem causes the elastic element to be compressed and thus results in the sealing action being improved in the area of the valve body. The elastic element consists of at least one formed part of rubber-elastic material but preferably is altogether a formed part made of such a rubber-elastic material. Preferred material for this purpose is plastic, especially a thermoplastic elastomer (TPE) capable of being produced by injection molding. However, the elastic element may also comprise of several parts as described in more detail below.

According to a preferred embodiment the elastic element is supported by a retaining ring on the valve-side end of the stem, said ring being secured in a groove provided in the stem. Such a retaining ring is made, for example, of a relatively hard material, e.g. polyalkylene and preferably polypropylene. On the can-side end the elastic element is preferably seated in a concentric enlargement of the central cut-out of the valve body.

The elastic element surrounds the stem of the inventive solid material valve concentrically. Especially if the elastic element consists of a single formed part it is considered expedient to provide in the can-side area a circumferential groove or recess in the inner wall, said groove being designed to accommodate displaced volume when the elastic element is compressed. This groove or cut-out is expediently surrounded by two adjacent beads that bear against and are supported by the stem thus causing the sealing action to be improved especially when the elastic element is compressed.

To facilitate valve actuation it is expedient to arrange for the central area of the elastic element to be located some distance away from the outer wall of the stem. This means except for its can-side bottom and valve-side top end the elastic element surrounding the stem is not in contact with the stem outer wall but arranged a certain distance away from it. In this way friction is eliminated and valve actuation thus made easier and, moreover, a certain space reserve is obtained into which the displaced mass of the elastic element may expand when the element is compressed. It is to be understood that a similar effect in terms of a "space reserve" may be achieved in this context by providing suitable recesses or grooves in the outer wall of the stem.

As per another embodiment the elastic element is additionally provided with a coil spring which is either integrated into the elastic element or serves to strengthen it. Integrated in this context means that the coil spring, as a whole or partially, is molded into the elastic element or is permanently attached to it by way of other fastening methods. However, the elastic element may also consist of two or more parts of which one is such a coil spring.

Such a multipart elastic element consists, for example, of a bottom part, a top part as well as a coil spring clamped between the bottom part and top part. The coil spring may thus be clamped in place between bottom and top part. Alternatively, top part and bottom part are attached to the coil spring by molding at the valve-side end and at the can-side end. In this case as well it is expedient in the interest of improving the sealing effect and making available a space reserve to arrange the inner circumferential groove on the bottom part located at the can-side end of the multipart elastic element. A skirting element extending down-wards may be provided on the valve-side top part, said skirting being spaced away from and surrounding the stem. Furthermore, outwardly extending sealing ribs may also be provided on the top part so that they bring about a sealing effect when a spray gun is mounted. Such an elastic element is preferably provided with a retaining ring, as described above, secured to the stem. Bottom and top parts are form pieces made of a rubber-elastic material, preferably a thermoplastic elastomer (TPE). The coil spring referred to is fabricated of customary spring steel material. Valve body, stem and retaining ring are expediently made of polyalkylene, for example of polypropylene, by means of an injection molding machine.

The invention is explained in more detail by way of the enclosed figures where.

All figures are shown as sectional representations.

Figure 1:
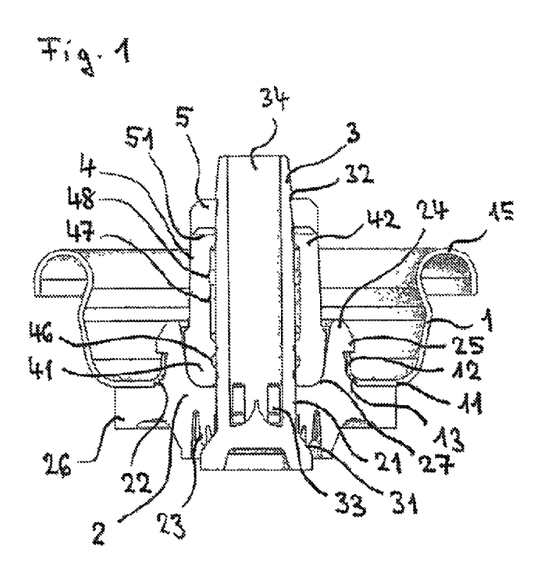
FIG. 1: is an overall view of the inventive solid material valve crimped to the dome of a pressurized can.

FIG. 1 is a sectional view of the dome portion of an aerosol can to which the solid material valve according to the invention has been attached by crimping. Via valve disk 1 the solid material valve is permanently crimped to the dome of the can, with the valve disk via its crimping rim 15 extending over and wrapping around the upper rim of the can dome D. The valve disk 1 itself has a central cut-out around which a channel- or trough-shaped central portion 11 extends. On the inside the valve disk is limited by the upright rim 12 while on the outside the trough rises towards crimping rim 15.

Inside the valve disk 1 valve body 2 has been arranged, with valve stem 3 being guided within the body's central circular cut-out. Via an upright rim 24 with outwardly extending projection 25 the valve body 2 is secured to the upright inner rim 12 of valve disk 1; an outwardly extending round face 26 adapts closely to the underside of trough 11 of the valve disk 1. The shape of the valve body 2 is stabilized by the can-side circumferential outer rim 26.

The valve body 2 has been provided with the required sealing elements to make sure the valve seals off safely at valve disk 1 around stem 3. On the valve side these elements comprise a series of sealing lips 22 arranged to act on the rounded area 13 of valve disk 1 in the transition zone between trough 11 and upright rim 12. On the can side, i.e. the side of valve body 2 facing the can interior, there are two circumferential sealing lips 23 that for the main part are arranged parallel to each other and parallelly to the configuration of the central cut-out 21 thus acting on the base 31 of stem 3. Base 31 serves as sealing face or seat and is a concentric enlargement of the stem 3 having a slightly arched shape. In the rest or shut-off position of the stem sealing lips 23 act against the base 31 and thus prevent the contents of the can from entering the inlet openings 33 arranged in stem 3.

On the valve side, i.e. facing outwardly, the valve body 2 has been provided with a concentric enlargement of the central cut-out 21, with said enlargement connecting directly to the upright rim 24 and serving to accommodate the bottom part of the elastic element 4.

Stem 3 is guided within the central cut-out 21 of the valve body 2; said stem having a central and closed-off bore 34 that serves as discharge duct for the can contents. On the can side stem 3 is provided with at least one lateral penetration 33 that serves as inlet opening for the can contents. In the rest or shut-off position of the valve as shown this inlet opening 33 is closed off through the sealing effect of lips 23 of valve body 2 acting against the sealing face or seat 31 of the stem. Upon actuation of the valve 3 the lips 23 are no longer capable of producing their sealing effect and the can contents is allowed to enter and be expelled through duct 34 via the inlet opening 33.

Stem 3 usually has at least two inlet openings 33.

On the valve side, i.e. in the area of its upper rim, the stem 3 has a circumferential groove 32 designed to accommodate a retaining ring 5. Between the underside 51 of the retaining ring 5 and the concentric enlargement 27 of the central cut-out 21 of valve body 2 the elastic element has been arranged which in this case is a formed part made of a thermoplastic elastomer having rubber-elastic properties. At its bottom part 41 formed part 4 is secured in the concentric enlargement 27 of the cut-out 21 of valve body 2, and its top part 42 is in contact with and supported by the underside 51 of the retaining ring 5. In the central area 47 the formed part is spaced away to some extent from the outer wall of stem 3 whereas its bottom part 41 and its top part 42 abut directly on the stem 3. Two circumferential concentric cut-outs 46 in the bottom part 41 and 48 in the top part 42 serve as space reserve accommodating the displaced volume when formed part 4 is compressed so that valve actuation is facilitated.

The solid material valve illustrated is a valve designwise intended to be connected to a spray gun with the valve being actuated by pressing down stem 3. The elastic element 4 in this case acts as a "spring" returning the stem to its rest position after the discharge of can contents has been completed. The volume of the elastic element 4 displaced during the compression process may to some extent move outwardly but will be accommodated within the bottom part 41, primarily in groove 46, with said bottom part being clamped in on the one hand between the outer wall of stem 3 and, on the other, the upright rim 24 of the valve body 2. Groove 46 has proven its worth especially with respect to the smooth functioning of the valve meaning that in the absence of said groove much higher forces would have to be exerted to actuate the valve. At the same time the beads of the elastic element 4 located to both sides of the groove act against the stem and yield a sealing effect preventing can contents from exiting along the outer wall of the stem guided within the central cut-out 21 of valve body 2 in the event the sealing lips 23 do no longer take effect.

Figure 2:
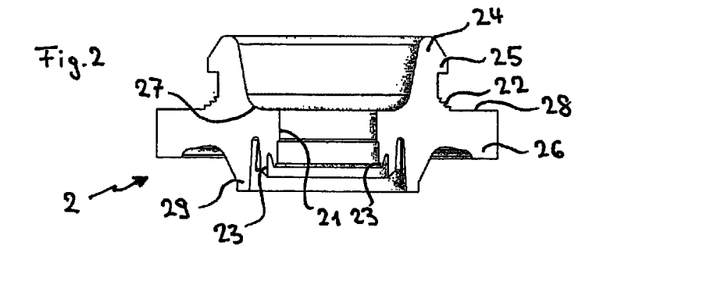
FIG. 2: shows the valve body of the solid material valve as per FIG. 1.

FIG. 2 shows the valve body 2 with its central cut-out 21 wherein stem 3 (not shown) is guided. On the valve-side the central cut-out 21 widens to form the concentric enlargement 27 accommodating the elastic element 4. The upright rim 24 with its outwardly extending projection 25 extends over the upright inner rim of the valve disk 1. On the valve-side the valve body 2 with its face 28 is in close contact with the underside of the trough 11 of the valve disk 1. Three sealing lips 22 make sure that there is a proper seal between valve body 2 and valve disk 1.

Two concentric circumferential rims 26 arranged towards the can side, one of which on the periphery, the other roughly along the extension of the upright rim 24, serve to stabilize the formed part 2. Immediately adjacent to and essentially in parallel with the central cut-out 21 there are the concentric sealing lips 23 acting on the enlargement 31 of stem 3 functioning as sealing face.

Figure 3:
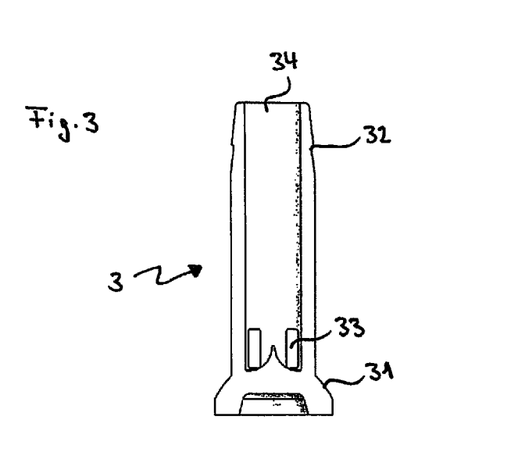
FIG. 3: shows the stem of a solid material valve as per FIG. 1.

FIG. 3 shows the stem 3 illustrated in FIG. 1 with central bore 34 also serving as discharge opening and two peripheral inlet openings 33 located in the can-side area of the stem. On the can side duct 34 is dead-ended and can only be accessed from the interior of the can via the inlet openings 33.

At the lower end of stem 3 an enlargement 31 serving as sealing face has been arranged, said enlargement in the illustration having an outward curving surface. Other outer contours are also possible, for example a truncated cone shape. At the top of the stem a circumferential groove 32 is provided serving to accommodate and locate the retaining ring 5.

Figure 4:
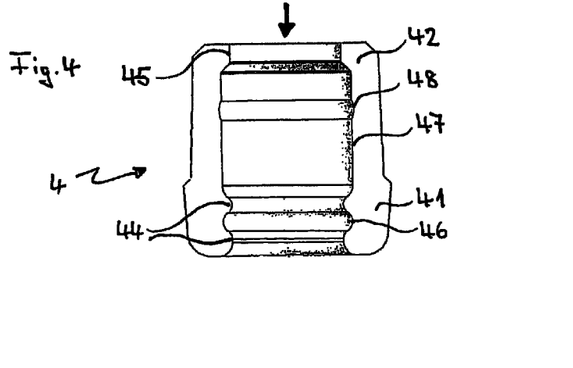
FIG. 4: illustrates the elastic element of the solid material valve as per FIG. 1.

In FIG. 4 the elastic element of FIG. 1 is shown which surrounds stem 3 and on the valve side rests on retaining ring 5 and on the can side in the concentric enlargement 27. The elastic element 4 made of a rubber-elastic material basically has a wall that with its the bottom part 41 and top part 42 via beads 44 and rim 45 comes up closely to stem 3. In the interjacent area 47 the elastic element extends for the main part parallel and at a distance to the stem, except for the concentric recess 48. Between the beads 44 concentric recesses 46 are arranged.

With its outer contour of bottom part 41 the elastic element 4 essentially adapts to the inner wall of the concentric enlargement 27 of valve body 2. The beads 44 serve as sealing element acting on the stem when the valve is opened. Since when the valve is actuated the elastic element is compressed in the direction shown by the arrow material is pressed into the circumferential inner recess 46 in the area of bottom part 41, said recess thus serving as space reserve. Simultaneously, the beads 44 are pressed against the outer wall of stem 3 thus increasing the sealing effect. Since the bottom part 41 with its outer contour 49 is essentially in contact with valve body 2 there is no other possibility for the elastic element to avoid the pressure applied.

Since the inner wall 47 has been recessed away from stem 3 friction between the stem and the elastic element is reduced and the valve can be actuated more easily. The circumferential recess 48 on the one hand serves to accommodate material displaced upon compression but at the same time enables an outward movement to be performed.

Figure 5:
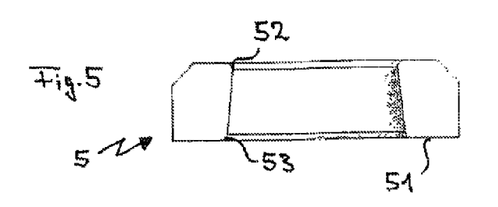
FIG. 5: shows the retaining ring of the solid material valve as per FIG. 1.

FIG. 5 illustrates the retaining ring 5 as per FIG. 1. On its inside ring 5 has a projecting edge 52 which engages with the groove 32 on stem 3. In comparison with the can-side edge 53 arranged at the underside 51 of the ring edge 52 projects towards the inside to a minor extent. The groove 32 of the stem 3 is of complementary configuration. At location 52 the inside diameter of the ring from edge to edge is slightly smaller than the outside diameter of stem 3 whereas the diameter of the ring 5 at location 53 from edge to edge corresponds approximately to the diameter of the stem 3 external to groove 32. The underside 51 serves as abutment for the elastic element 4.

Figure 6:
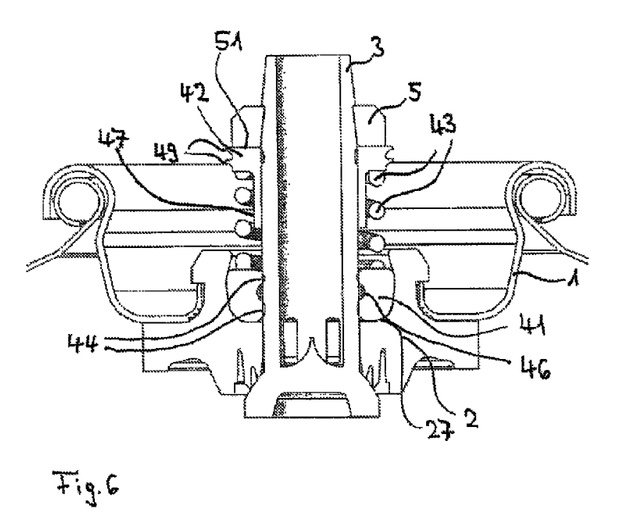
FIG. 6: is a second variant of a solid material valve in accordance with the invention.

In FIG. 6 an inventive solid material valve is shown comprising a valve disk, valve body, stem and retaining ring that mainly correspond to the variant illustrated in FIG. 1. However, in the variant depicted the stem has been provided with four inlet openings and the diameter of duct 34 is larger so that greater foam volumes can be discharged. Valve body 2 has been designed so as to be more stable and altogether suitable to absorb higher forces both from the inside of the pressurized can and from the valve side.

The elastic element consists of three components of which the bottom part 41 and the bottom part 42 are made of a thermoplastic elastomer. The configuration of the bottom part 41 coincides with the illustration in FIG. 4, i.e. it comprises two beads and an interjacent central recess provided in the inner wall. The bottom part has been shaped to suit the concentric enlargement 27 of the valve body 2.

On the valve side a coil spring 43 follows and rests on the bottom part 41, said spring towards the valve side being in contact with and abutting against the bottom edge of the top part 42. The top part 42 in turn is in contact with the underside 51 of the retaining ring 5.

Two circumferential sealing lips 49 extend over the periphery of top part 42, said lips providing a sealing effect at the inner wall of the receiving element of a spray gun. Towards the can side extension 47 is arranged and designed as free skirting element surrounding the stem 3 and being spaced slightly away from it.

Figure 7:
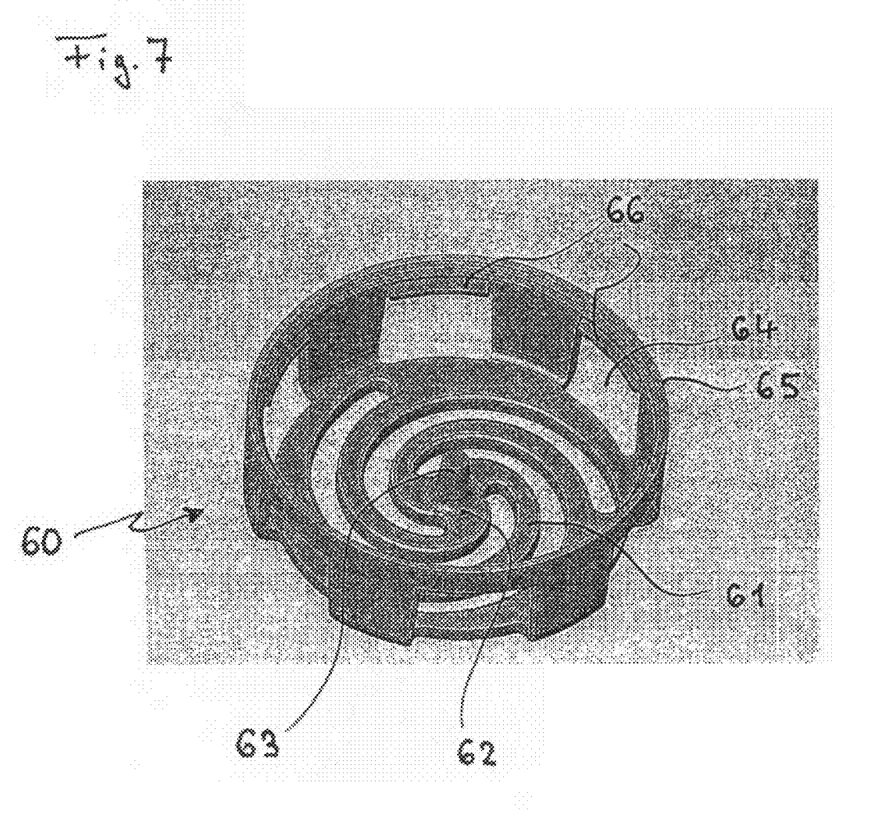
FIG. 7: illustrates a spring cage as part of an inventive valve.

FIG. 7 shows a spring cage 60 provided with spirally configured spring elements 61 converging centrally at point 62 where a supporting element 63 has been arranged. The spring elements 61 form the bottom of cage 60 which furthermore is provided with wall 65 in which penetrations 64 have been arranged. On the side off the bottom the wall 65 has been provided at the penetrations with projections 66 pointing to the inside and engaging with the respective recesses 67 (FIG. 8) arranged on valve body 2.

Figure 8:
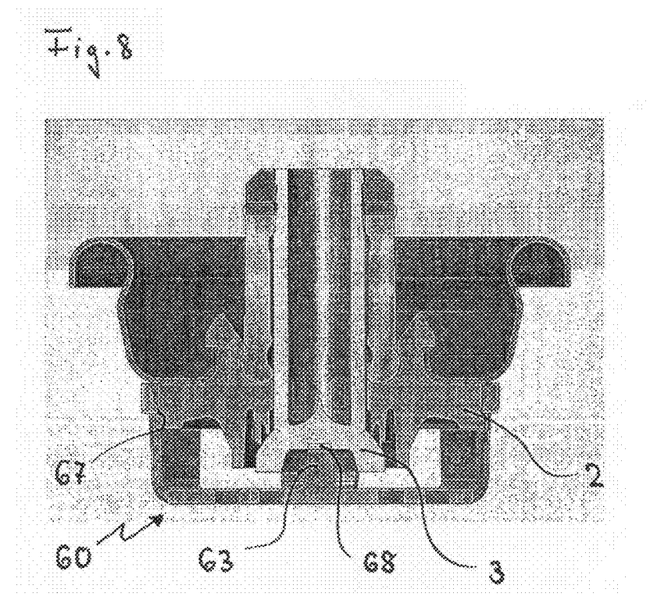
FIG. 8: shows how the spring cage of FIG. 7 interacts with a valve body.

FIG. 8 shows an inventive valve with spring cage 60 mounted and secured by means of the inwardly extending projections 66 engaging with the recesses 67 provided on the valve body 2. The supporting element 63 projects centrally into a recess 68 arranged at the can-side end of stem 3 for which it thus provides additional support. Numerous penetrations both in the bottom and wall areas of the spring cage 60 always enable the can contents to freely enter the valve mechanism.

The embodiments illustrated in FIGS. 6 to 8 are meant for applications in which the elastic element 4 must have a higher restoring force.

The solid material valves in accordance with the invention are primarily designed for use with spray guns. However, it goes without saying that other types of discharge aids may be employed as well.

The invention claimed is:

1. Solid material valve for pressurized cans, provided with a valve disk, a valve body (2) arranged in the valve disk (1), a stem (3) guided within a central cut-out (21) of the valve body (2), with at least one inlet opening (33) cleared for the passage of the can contents by actuating said stem (3) as well as at least one discharge opening, one elastic element (4) acting on the stem (3) and sealing elements (22, 23) arranged and acting between the valve disk (1) and valve body (2) and between valve body (2) and stem (3), characterized in that the elastic element (4) is provided with at least one formed part made of a rubber-elastic material and surrounding the stem (3) concentrically with said elastic element (4) being a separate component from the valve body and resting in a concentric enlargement (27) of the central cut-out of the valve body (2) at the can side and on the stem (3) at the valve side.

2. Solid material valve according to claim 1, characterized in that the valve disk (1) consists of a central section (11) with a trough-shaped profile and an upright inner rim (12) at which the valve body (2) is located.

3. Solid material valve according to claim 2, characterized in that the valve body (2) has an upright rim (24) provided with an outward projection (25) engaging with and extending over the inside rim (12) of the valve disk (1).

4. Solid material valve according to any one of the above claims, characterized in that the valve body (2) is provided towards the can side with a concentric circumferential outer ring (26) that serves stabilizing purposes.

5. Solid material valve according to claim 1, characterized in that the valve body (2) in its contact zone to the valve disk (1) is provided with concentric circumferential sealing lips (22).

6. Solid material valve according to claim 5, characterized in that the sealing lips (22) act on an inwardly rounded area (13) of the valve disk (1) at the base of the inner rim (12).

7. Solid material valve according to claim 1, characterized in that the valve body (2) is provided with at least one concentric circumferential sealing lip (23) acting against a sealing face or seat (31) arranged on a stem (3).

8. Solid material valve according to claim 7, characterized in that the sealing face or seat (31) is a concentric enlargement of the stem (3) located at the can-side stem end and having a tapered or arched outer contour.

9. Solid material valve according to claim 7 or 8, characterized in that the valve body is provided with two sealing lips (23) spaced away from each other and arranged in parallel with the stem (3) and acting on the sealing face or seat (31) of stem (3).

10. Solid material valve according to claim 1, characterized in that on the valve side the stem (3) has a groove (32) which accommodates a retaining ring (5), with the elastic element (4) abutting against the can-side face (51) of said ring and with the elastic element (4) consisting of a thermoplastic elastomer.

11. Solid material valve according to to claim 10, characterized in that the elastic element (4) is additionally provided with a spring element (43) integrated into and/or strengthening the elastic element (4), and said elastic element (4) consists of bottom part (41), top part (42) as well as coil spring (43) which are located between bottom part (41) and top part (42) or be provided in the form of a spring cage (60) secured on the can side of the valve disk (1) or valve body (2), said cage acting against the can-side end of the stem (3).

12. Solid material valve according to claim 1, characterized in that the elastic element (4) is provided on the can side end with two circumferential inner sealing lips (44) and a circumferential concentric recess (46) arranged between said lips.

13. Pressurized can for the discharge of mounting foam, being provided with a solid material valve in accordance with claim 1.

* * * * *